United States Patent [19]

LaBruna

[11] 4,437,590
[45] Mar. 20, 1984

[54] POSITIVE EXPULSION FLUID STORAGE TANKS

[75] Inventor: Anthony J. LaBruna, Clarence, N.Y.

[73] Assignee: Textron Inc., Providence, R.I.

[21] Appl. No.: 360,458

[22] Filed: Mar. 22, 1982

[51] Int. Cl.³ .............................................. B67D 5/00
[52] U.S. Cl. .................................. 222/386.5; 60/39.48
[58] Field of Search ................. 138/30; 222/386.5, 95; 60/39.48

[56] References Cited

U.S. PATENT DOCUMENTS

| 2,397,796 | 4/1946 | Lippincott | 138/30 |
| 3,494,513 | 2/1970 | Bauer | 60/39.48 |
| 3,722,751 | 3/1973 | Bisciglia | 222/95 |
| 3,895,746 | 7/1975 | Bauer | 60/39.48 |
| 4,129,025 | 12/1978 | Carey et al. | 72/348 |
| 4,216,881 | 8/1980 | Rosman | 222/95 |

Primary Examiner—H. Grant Skaggs
Attorney, Agent, or Firm—Bean, Kauffman & Bean

[57] ABSTRACT

There is disclosed in a positive expulsion fluid storage tank an improved pressure responsive diaphragm of the rolling inversion type. The diaphragm is of gradually increasing wall thickness advancing from the rim thereof towards the crown portion thereof, and the crown portion of the diaphragm is radially gradated into a thinner mid-crown portion.

6 Claims, 3 Drawing Figures

POSITIVE EXPULSION FLUID STORAGE TANKS

BACKGROUND AND OBJECT OF THE INVENTION

This invention relates to positive expulsion tanks such as are presently employed for carrying rocket engine thrust producing propellants in space vehicles, or the like; and more particularly to the sectional thickness variations of the sheet "liners" or "bladders" or rolling "diaphragms" such as are employed in such tanks as are shown for example in prior U.S. Pat. Nos. 3,275,193; 3,494,513; and co-assigned U.S. Pat. No. 4,129,025. It is the primary object of this invention to provide for this purpose an improved diaphragm which is of novel sectional thickness variation design; such as will in improved manner eliminate the tendencies of such diaphragms to locally wrinkle (or buckle) incidental to shape inversion when operating to expel the tank contents. A further object is to attain this improved capability without resorting to use of accessory roll guide and/or control devices such as are disclosed for example in U.S. Pat. Nos. 3,275,193 and 3,494,513.

SUMMARY OF THE INVENTION

The invention may be employed in tanks of a variety of shapes, such as are of cylindrical; spherical; ovate; conical; or toroidal configurations, so as to enable the tanks to occupy the space available in the vehicle design. Some of such configurations are illustrated for example in the above referenced patents. In any case, the diaphragm of the invention is formed of malleable material and is configured so that it initially conforms substantially to the interior surface of one end (or side) of the tank; and then under fluid pressure it progressively rolls away therefrom until it finally conforms closely to the other end (or side) of the tank to exclude the "fluid product" thereof without incidental wrinkling or buckling thereof; thereby undergoing no undue stress concentrations or strain intensification during the process.

The diaphragm of the invention is of such design as to be adapted to be made by way of example, by shear-spinning or otherwise deforming a flat disk or blank of a suitably malleable sheet metal or plastic workpiece onto a suitably shaped mandrel, in order to provide a generally cup-shaped preform which is configured generally in conformance with the pattern of the interior surface of approximately a one-half portion of the tank at one side of the diametral plane thereof. This preform is then machined or otherwise shaped into a novel sectional thickness-varying configuration which features a gradually increasing wall thickness advancing from the rim of the preform (which is to be attached perimetrally to the inside girth or "equator" of the tank) towards the "crown" portion of the diaphragm. The crown portion per se of the diaphragm is radially gradated into a thinner mid-crown portion. Alternatively, the workpiece disk while in flat "blank" form may be machined or otherwise sectionally modified as above described prior to the spinning operation thereon, so as to provide the improved end product diaphragm of the invention.

This novel combination of sectional thickness variations throughout its axial length provides the diaphragm of the invention with the ability to start to flex and roll with improved facility initially at the equator of the tank when external fluid pressure is applied against its generally convex-shaped crown, which then causes it to proceed to roll in smoothly controlled manner until finally into an inverted substantially "mirror image" of its original configuration against the exit end of said tanks. Incidental to termination of the rolling process, the sectionally thinned central portion of the crown of the diaphragm resiliently "snap-action" deforms snugly against and into conformance with the surface of the remote discharge end wall of the tank; thereby squeezing both radially laterally thereof and finally against the exit end configuration of said tank in order to provide an improved tank content expulsion performance.

DETAILED SPECIFICATION

Figure 1:
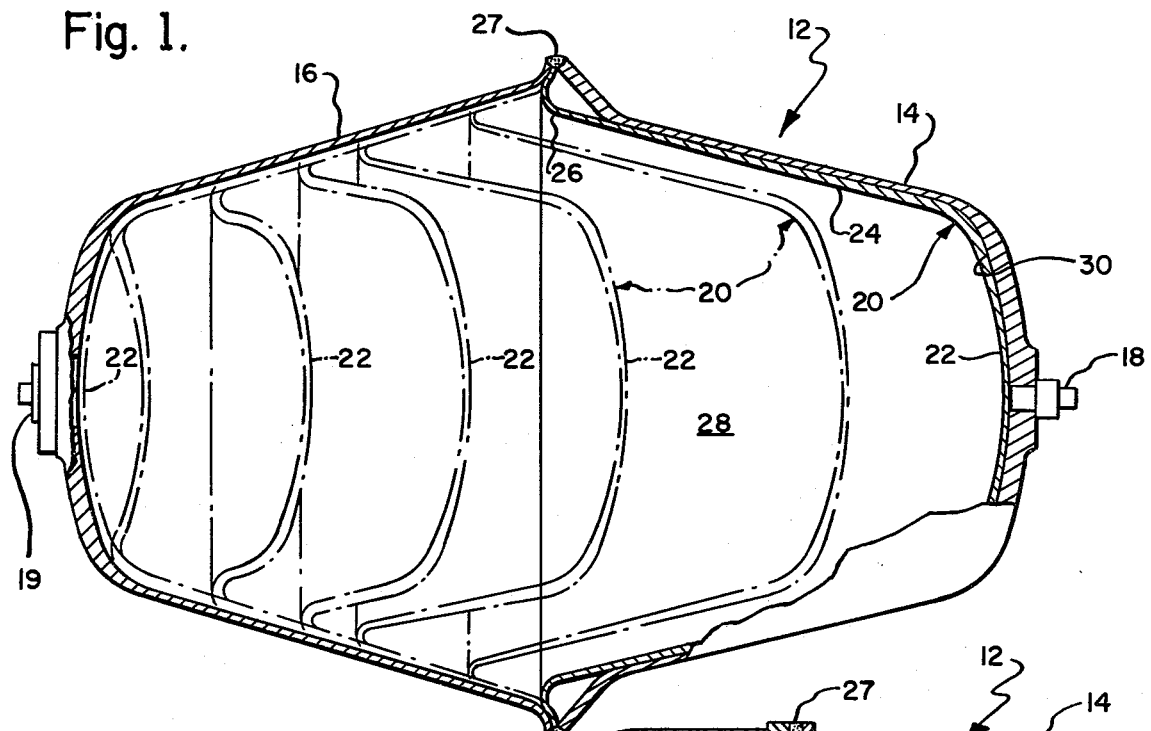
FIG. 1 is a side elevational view partially broken away to show in section a typically shaped storage tank incorporating an expulsion diaphragm of the present invention configured in accordance with various stages of its operation.
Figure 2:
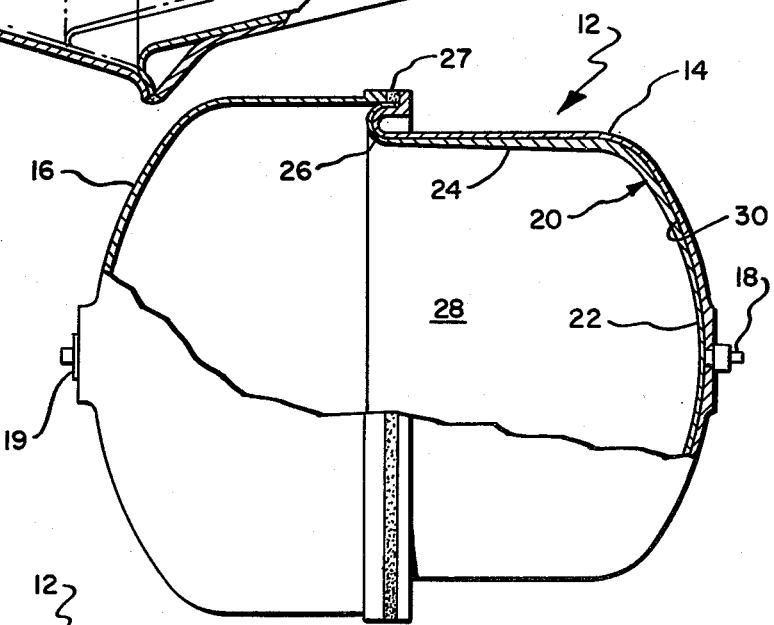
FIGS. 2 and 3 are similar views showing the diaphragm as initially installed within differently shaped tanks.
Figure 3:
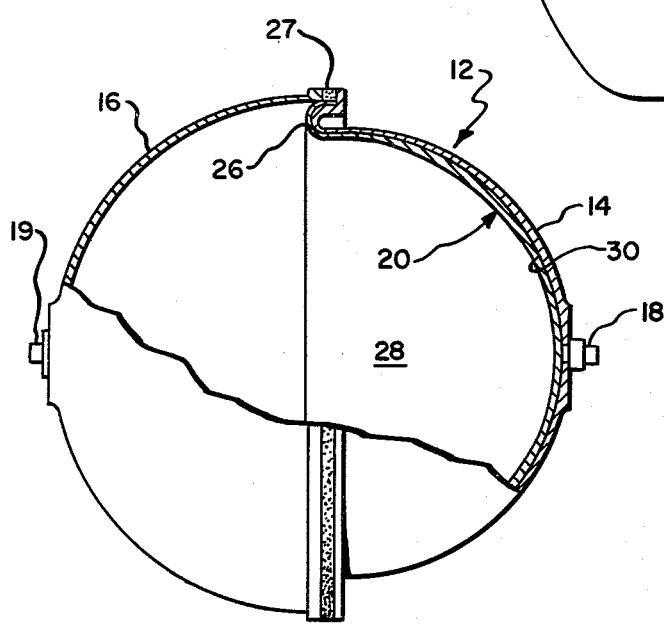

The diaphragm of the invention is shown herein as being employed in variously shaped tanks. However, to avoid unnecessary redundancy in description of its operation, it will be described by way of example only in connection with FIG. 1 of the drawing.

The tank shell which is designated generally at 12 may be of any suitable construction such as being formed by rim-joining a pair of shear-spun tank half-shells 14 and 16, having suitable expulsion fluid inlet and product discharge or outlet devices 18 and 19, respectively. FIG. 1 also illustrates how the half-shells 14 and 16 may vary slightly in size in order to accommodate for changes in the shape of the diaphragm which is indicated generally by numeral 20 incident to product expulsion operation. The diaphragm 20 is of a generally cup-shaped configuration having a crown or dome portion 22, a frusto-conically or cylindrically shaped side wall portion 24, and an outwardly rolled rim portion 26, which is suitably secured to the tank shell such as by being welded to the half-shells 14 and 16 adjacent their juncture as shown at 27.

Thus, the diaphragm 20 serves to divide the interior of tank shell 12 into separate product storage and expulsion fluid chambers 28 and 30, respectively. It will be understood that the creation of a pressure differential across diaphragm 20, by introducing an expulsion fluid such as a gas under pressure into the chamber 30 while outlet device 19 is open, will cause the diaphragm to roll upon itself away from its tank-full configuration as shown at the extreme right end of each tank of the drawing herewith; through its intermediate configurations as illustrated at FIG. 1; and finally into a fully inverted or tank empty configuration as shown at the left hand end of the tank of FIG. 1. The construction is such that the diaphragm will finally roll into firm contact with the inside wall surface of the half-shell 16; to displace all of the stored product with improved expulsion efficiency as will be further explained hereinafter.

It is a particular feature of the present invention that the outwardly rolled rim configuration 26 of the diaphragm, in combination with the axially increasing thickness of the side wall portion 24 insures that when expulsion pressure is applied against the crown of the diaphragm, this pressure is transferred as an end thrust loading through the side wall into a bending loading on the rim 26. Since the bend in the rim is offset inwardly relative to the tank section 16, this end thrust loading thereon insures that the diaphragm commences its rolling at the rim portion and then proceeding as illustrated by the progression of broken line showings of the diaphragm in FIG. 1 of the drawing.

Furthermore, the crown portion of the preform which is to comprise the crown portion of the finished diaphragm is preferably shaped so as to symmetrically and progressively thin down the sectional thickness of the top of the crown toward the center thereof as is shown at 22. This overall sectional configuration of the diaphragm 20 provides it with the facility to throughout its intermediate unrolling stages, maintain its illustrated general contours; and as illustrated at the extreme left side portion of FIG. 1, the dome portion 22 of the diaphragm resiliently snaps (with the so-called "oil-can" action) into complete intimate contact with the wall surface of the tank at its discharge end, thereby insuring complete expulsion of the tank contents.

As set forth for example in co-assigned prior U.S. Pat. No. 4,129,025, the diaphragm 20 is preferably fabricated by a process involving the initial step of shear-spinning a circular plate or sheet of malleable metal onto a mandrel in order to form a frusto-conically shaped preform having initially a relatively thick unspun crown or dome portion and frusto-conically spun side wall 24 and rim portions 26. This preform is then preferably subjected to a conventional annealing operation to remove residual stresses developed during the forming process. The preform is then machined into the more precisely prescribed varying-sectional thickness form in accordance with the present invention as described hereinabove.

What is claimed is:

1. In a tank of the type which is adapted to be initially substantially filled with a supply of fluid to be expelled therefrom by means of fluid pressure forces acting against a diaphragm which has a side wall portion and convex crown portion shaped to initially lie snugly against an approximately one-half portion of the interior surface of said tank and a rim portion anchored to a mid-portion of said tank, whereby upon admission into said tank of said fluid pressure forces said supply fluid may be substantially completely expelled therefrom by way of an exit in response to rolling inversion of said diaphragm into a reverse shaped configuration fitting against the opposite one-half portion of the interior surface of said tank, the improvement comprising:

said side wall portion being of progressively increasing sectional thickness leading from said rim portion toward said crown portion, said crown portion being of progressively decreasing sectional thickness leading radially inwardly from said side wall portion toward the center thereof, and said rolling inversion of said diaphragm commences adjacent said rim portion.

2. In the improvement of claim 1, said crown portion has an initial convex configuration and is of sufficient sectional thickness to withstand depression from said convex configuration to assume a concave configuration upon initial entry of said fluid pressure forces but insufficient sectional thickness to withstand snap-action depression into said concave configuration in response to said fluid pressure forces upon arrival of said crown portion adjacent said opposite one-half portion of said interior surface of said tank adjacent said exit.

3. In the improvement of claim 1, said rim portion is initially rolled outwardly of the general profile of said side wall portion whereby said fluid pressure forces when applied against said crown portions are transferred as an end thrust loading through said side wall portion and operates as a bending load on said rim portion.

4. In the improvement of claim 2, said rim portion is initially rolled outwardly of the general profile of said side wall portion whereby said fluid pressure forces when applied against said side wall portion and operates as a bending load on said rim portion.

5. In the improvement of claim 4, said diaphragm being fabricated by shear-spinning a malleable metal workpiece into a cup-shaped preform and then machining the preform.

6. In the improvement of claim 4, said diaphragm being fabricated by machining a malleable flat metal workpiece and then shear-spinning the workpiece into cup-shaped form.

* * * * *